(12) United States Patent
Bernini

(10) Patent No.: US 9,173,344 B2
(45) Date of Patent: Nov. 3, 2015

(54) APPARATUS FOR CUTTING GRASS

(76) Inventor: Fabrizio Bernini, Bucine (IT)

( * ) Notice: Subject to any disclaimer, the term of this patent is extended or adjusted under 35 U.S.C. 154(b) by 464 days.

(21) Appl. No.: 13/482,220

(22) Filed: May 29, 2012

(65) Prior Publication Data

US 2013/0241475 A1 Sep. 19, 2013

(30) Foreign Application Priority Data

Mar. 19, 2012 (EP) .................................... 12160183

(51) Int. Cl.
*A01D 34/00* (2006.01)
(52) U.S. Cl.
CPC .................................... *A01D 34/008* (2013.01)
(58) Field of Classification Search
CPC .................................................. A01D 34/008
USPC ......................................................... 320/108
See application file for complete search history.

(56) References Cited

U.S. PATENT DOCUMENTS

| | | | |
|---|---|---|---|
| 5,490,370 A * | 2/1996 | McNair et al. ................. | 56/11.9 |
| 6,009,358 A * | 12/1999 | Angott et al. ................... | 701/25 |
| 8,183,827 B2 * | 5/2012 | Lyon .............................. | 320/108 |
| 8,314,513 B2 * | 11/2012 | Aoyama et al. ............... | 307/104 |
| 2009/0315501 A1* | 12/2009 | Li et al. ..................... | 318/568.12 |
| 2012/0260617 A1* | 10/2012 | Gilpatrick ...................... | 56/11.9 |

* cited by examiner

*Primary Examiner* — Samuel Berhanu
*Assistant Examiner* — Tessema Kebede
(74) *Attorney, Agent, or Firm* — Lucas & Mercanti, LLP

(57) ABSTRACT

An apparatus for cutting grass including: a lawn mower equipped with: a movement device for movement of the lawn mower at least inside a cutting area (S), one or more blades for cutting grass in the cutting area (S), a power supply unit for supplying electrical power to one or more of the movement device and the one or more blades; a recharging base for the lawn mower, including at least a first inductive element (E1) and a first control unit associated with the first inductive element (E1) and configured to enable the flow of a certain current (I) in the first inductive element (E1). The lawn mower comprises has a second inductive element (E2) associated with the power supply unit and coupleable to the first inductive element (E1) for a recharging of the power supply unit, and a second control unit. The second control unit is configured to generate a charge signal (CS) representative of a charge level of the power supply unit; transmit the charge signal (CS) to the first inductive element (E1) through the second inductive element (E2). The first control unit is configured to receive the charge signal (CS) through the first inductive element (E1); regulate the current (I) based on the charge signal (CS).

7 Claims, 4 Drawing Sheets

APPARATUS FOR CUTTING GRASS

CROSS-REFERENCE TO RELATED APPLICATION

This application claims the benefit of priority from European Patent Application No. 12160183.5, filed Mar. 19, 2012, the contents of which are incorporated herein by reference.

FIELD OF THE INVENTION

The present invention concerns an apparatus for cutting grass.

BACKGROUND OF THE INVENTION

As is known, at present, automatic lawn mowers are predisposed to operate within predetermined cutting areas.

Lawn mowers are utilized to keep lawns, gardens and grassy areas in general, in optimal condition, that is, to keep the grass below a certain height in a substantially homogeneous manner throughout the entire cutting area.

The cutting area is often delimited by a perimeter wire or cable, in which an electrical signal is propagated; the lawn mower, detecting this electrical signal, is capable of recognizing the boundaries of the cutting area and adjusting its own movement and/or cutting activities accordingly.

As is known, lawn mowers are equipped with an independent electrical power supply unit, which has the function of supplying electrical power to the electrical and electromechanical devices present inside the lawn mower itself, such as, for example, the motors designed to drive the wheels and the blades, the electronic circuits dedicated to detection of the presence of grass, to detection of the presence of the perimeter cable, to the processing of the data collected and to controlling the various motors, etc.

When the power supply unit, which is typically made up of a battery or a battery pack, nears exhaustion, the lawn mower goes to a recharging base, where the power supply unit can be recharged so as to permit, after a certain amount of time, continuation of the activity of the lawn mower.

To date, there are various known techniques for recharging the power supply unit on board a lawn mower.

One such technique provides for a coupling of an inductive type between a first inductive element that is part of the recharging base, and a second inductive element mounted on the lawn mower and connected to the power supply unit to be recharged.

A control unit that is part of the recharging base and associated with the first inductive element, enables the flow of a pre-established current therein, so that power can be transferred to the second inductive element and the power supply unit of the lawn mower can thus be recharged.

Typically, the current delivered to the power supply unit is constant during recharging. The value of this current may be within the range of about 100 mA to 4 A.

This makes it particularly difficult to determine the most suitable value for the intensity of the current utilized, as a current that is too low can result in unduly long recharging times, whereas a current that is too high could very seriously damage the power supply unit as recharging nears completion.

In light of the above, the aim of this invention is to make available an apparatus for cutting grass, wherein the recharging of the power supply unit mounted on the lawn mower takes place in a reasonably brief time, without running the risk of damaging the power supply unit and the lawn mower.

An ancillary aim of the invention is to supply an apparatus for cutting grass, wherein the efficiency of the transfer of power from the recharging base to the lawn mower is maximized.

A further ancillary aim is to make available an apparatus for cutting grass that is capable of operating properly even when the distance between the inductive element that is part of the recharging base and the inductive element mounted on the lawn mower is fixed at a value ranging between 0 and 3 cm.

An additional ancillary aim of the invention is to provide an apparatus for cutting grass, wherein the recharging base is capable of determining in a simple and automated manner, the presence of the lawn mower so as to begin the process of recharging the power supply unit.

These and other aims are substantially achieved by an apparatus for cutting grass according to that which is described in the attached claims.

Further characteristics and advantages will become more apparent from the detailed description of a preferred, but not exclusive, embodiment of the invention.

BRIEF DESCRIPTION OF THE DRAWINGS

This description is provided herein below, with reference to the attached figures, which are also provided by way of purely illustrative, and thus non-limiting, example, wherein.

DETAILED DESCRIPTION OF THE INVENTION

With reference to the attached figures, "100" is used as an overall indication of an apparatus for cutting grass according to the invention.

Figure 1:
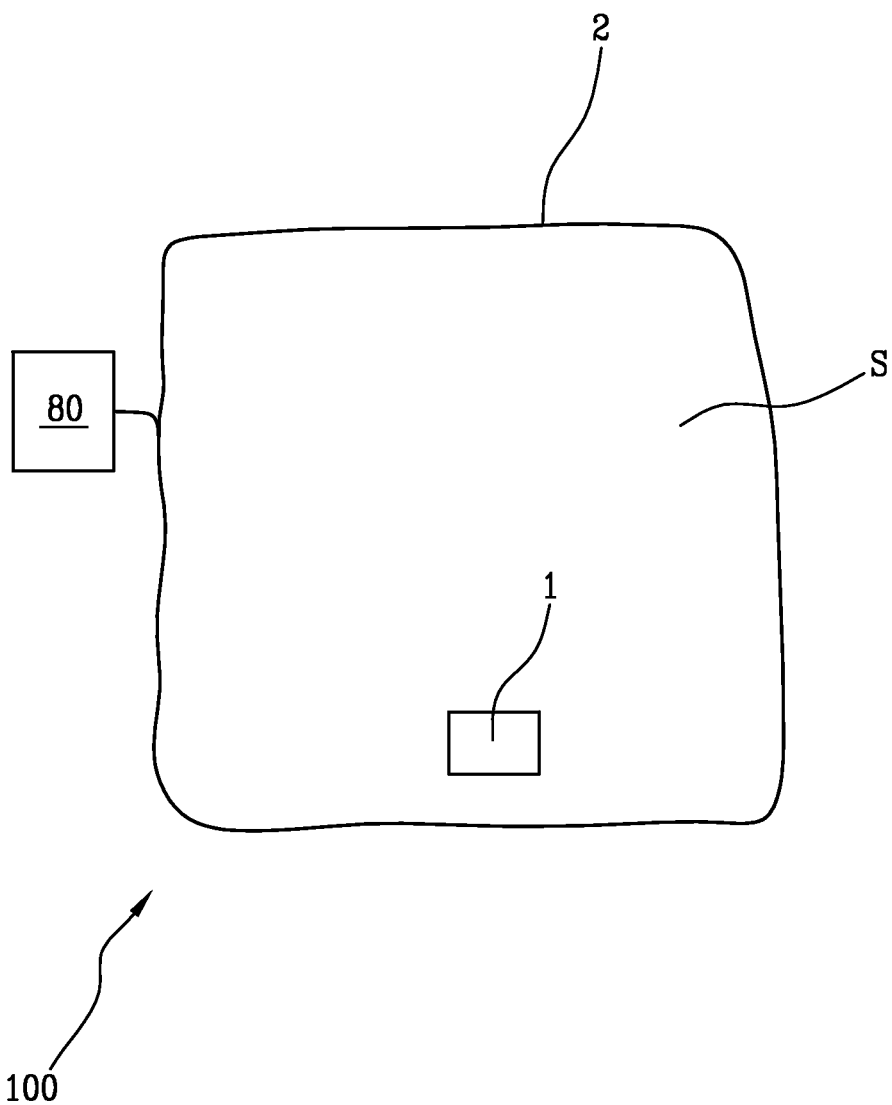
FIG. 1 is a block diagram of an apparatus according to the invention.

The apparatus 100 (FIG. 1) comprises a lawn mower 1, predisposed to operate at least within a cutting area S.

In one embodiment, the cutting area S is delimited by a perimeter cable 2.

Note, however, that the invention finds suitable application even in the case where the lawn mower is configured to determine the boundaries of the operative area thereof in a different manner.

Figure 2:
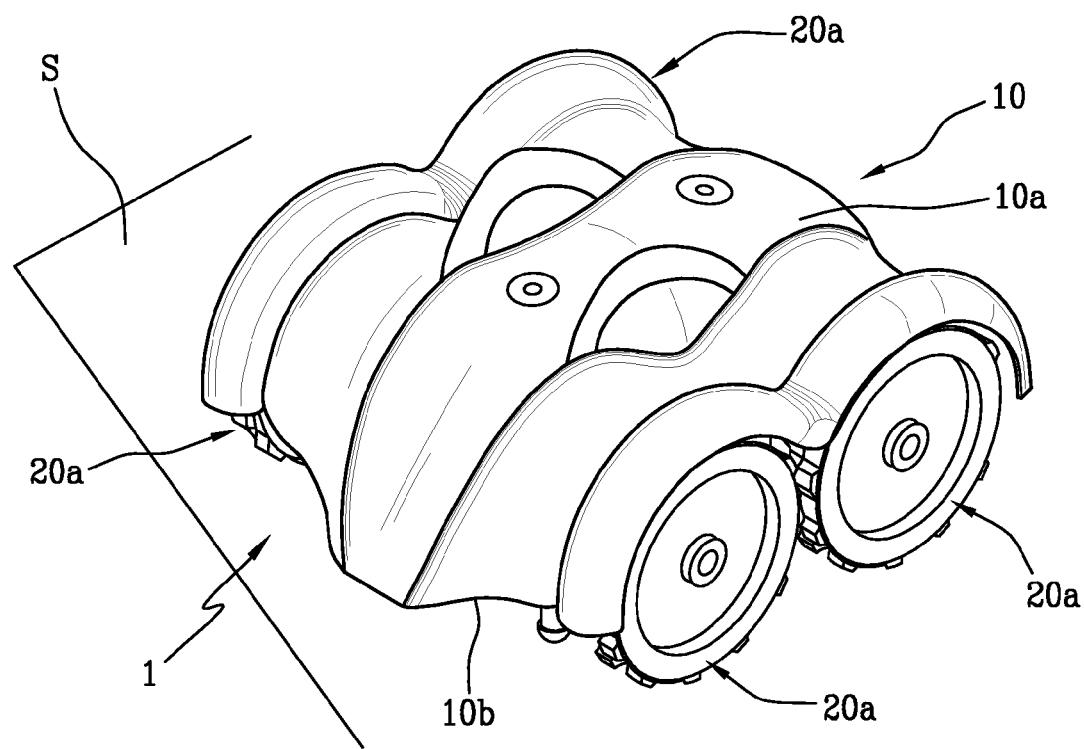
FIG. 2 shows a schematic perspective view of a lawn mower that is part of the apparatus according to the present invention.

The lawn mower 1 (FIGS. 2-3) comprises above all a frame 10; the frame 10 can comprise, for example, an upper body 10a and a lower body 10b, preferably removably associated with one another.

The upper body 10a and the lower body 10b can be realized, for example, in plastic material.

The lawn mower 1 further comprises movement means 20 mounted on the frame 10 to move the lawn mower 1 with respect to the cutting area S; the latter may consist of a lawn, a garden, a flowerbed, or in general any surface on which the lawn mower 1 is required to operate.

The movement means 20 preferably comprises a plurality of wheels 20a, assembled on the frame 10, and one or more motors, predisposed for the rotating movement of said wheels 20a.

By way of example, the lawn mower 1 shown in the accompanying figures is provided with four wheels 20a, which are appropriately motorized.

The lawn mower 1 further comprises one or more blades 30 (schematically shown in FIG. 3), installed on the frame 10, to cut the grass existing in the cutting area S.

Advantageously, the blades 30 are driven by suitable motors, which are housed inside the frame 10.

By way of example, the motors cited may be electric motors.

The lawn mower 1 comprises a power supply unit 70. The power supply unit may comprise, for example, one or more batteries.

The power supply unit 70 has the function of supplying electrical power to the electrical/electronic/electromechanical devices present on board the lawn mower 1.

The power supply unit 70 can be recharged at a recharging base 80.

By way of example, the recharging base can be positioned along the perimeter cable 2, or in the vicinity thereof.

The recharging base 80 (FIG. 4) comprises at least a first inductive element E1 and a first control unit 85 associated with said first inductive element E1.

The first control unit 85 is configured at least to enable the flow of a given current I in the first inductive element E1. As will become clearer below, the current I is suitably regulated so as to optimize the stage of recharging the power supply unit 70.

The lawn mower 1 comprises a second inductive element E2 associated with the power supply unit 70 and coupleable to the cited first inductive element E1 for recharging of the power supply unit 70.

The lawn mower 1 further comprises a second control unit 75, configured to monitor the operation of the lawn mower 1. In particular, the second control unit 75 is configured to manage the recharging of the power supply unit 70 when the lawn mower 1 is at the recharging base 80.

The second control unit 75 is configured above all to generate a charge signal CS that is representative of a charge level of the power supply unit 70.

Preferably, the frequency of the charge signal CS is representative of the charge level of the power supply unit 70.

Preferably, the frequency of the charge signal CS is proportional to the charge level of the power supply unit 70.

By way of example, the frequency of the charge signal CS may be in a range between 250 KHz and 200 KHz, which are representative of a charge of about 29.4 V (fully charged battery) and a charge of about 22 V (substantially discharged battery), respectively.

The second control unit 75 is further configured to transmit the charge signal CS, by means of the second inductive element E2, to the first inductive element E1 of the recharging base 80.

Figure 3:
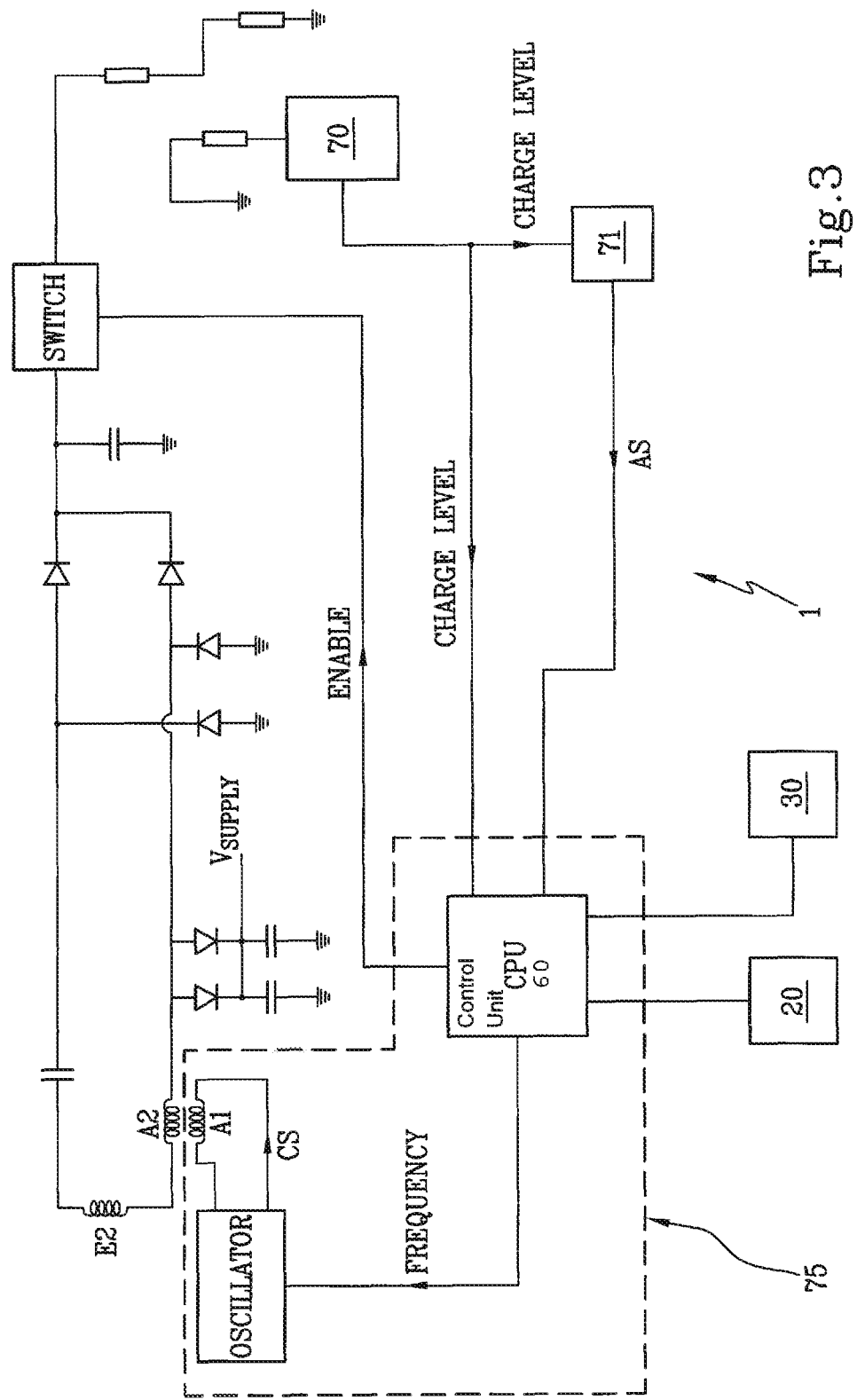
FIG. 3 is a block diagram of a lawn mower that is part of the apparatus according to the invention.

In the preferred embodiment, which is schematically illustrated in FIG. 3, the charge signal CS is generated by means of an oscillator, and transmitted to the second inductive element E2 by means of a pair of windings A1, A2, the second of which is serially connected to the second inductive element E2.

Preferably, the charge signal CS is transmitted by means of the so-called "conveyed wave" technique.

The first control unit 85 is, in turn, configured to carry out the following the following operations:
  receive the charge signal CS by means of the first inductive element E1; and
  regulate the current I based on the charge signal CS received.

Preferably, the first control unit 85 is configured to decrease an intensity of the current I when there is an increase in the charge level of the power supply unit 70.

In practice, the closer the power supply unit 70 comes to a full charge, the more the intensity of the current I is reduced, and thus also the power supplied by the recharging base 80 to the lawn mower 1 for the recharging of the power supply unit 70.

In a preferred embodiment, the first control unit 85 compares the charge signal CS with pre-stored data that are representative of the reference values for the charging of the power supply unit 70. If the charge level of the power supply unit 70 is below a first threshold, the first control unit keeps the current intensity I constant at a first value. If the charge level of the power supply unit 70 is above the cited first threshold, the first control unit then decreases the current intensity I.

Moreover, if the charge level of the power supply unit 70 exceeds a second threshold, which is higher than the first threshold, the first control unit 85 keeps the current intensity I constant at a second value, which is lower than the cited first value.

By way of example, the first threshold may be equal to 22 V and the second threshold may be equal to 29.4 V, while the first value may be equal to 4 A and the second value may be equal to 200 mA.

In the preferred embodiment, the regulation of the current I based on the charge signal CS takes place by means of the PWM technique.

Figure 4:
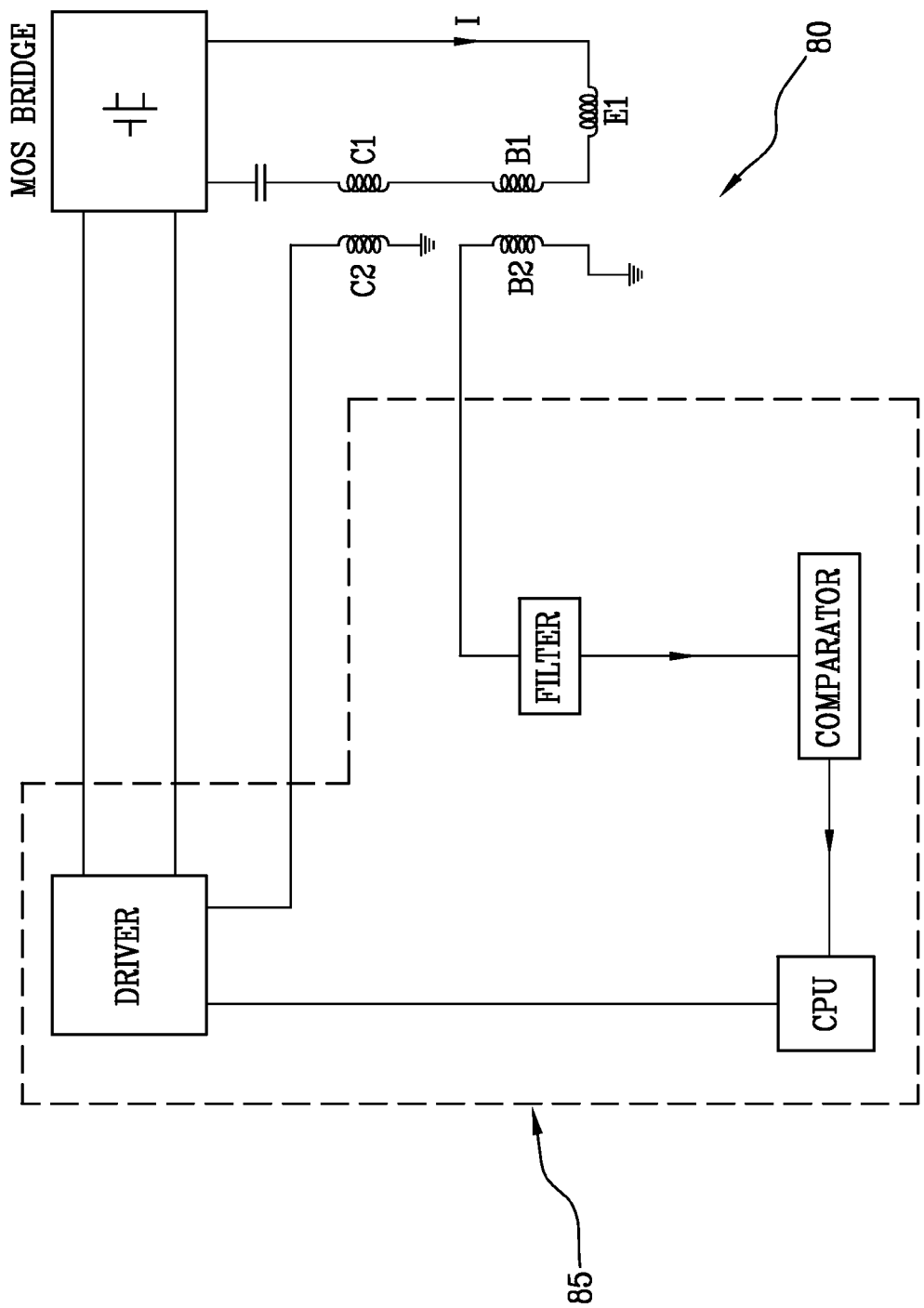
FIG. 4 is a block diagram of the recharging base appearing in FIG. 1.

In the embodiment schematically shown in FIG. 4, the first control unit 85 comprises a filter and a comparator, which have the purpose of identifying the frequency of the charge signal CS and comparing it with reference values. The first control unit 85 further comprises a CPU programmed to command the PWM drivers based on the data received from the comparator.

Preferably, after being detected by means of the first inductive element E1, the charge signal CS is propagated further through a first pair of windings B1, B2; the B1 winding is serially connected to the cited filter, whereas the B2 winding is serially connected to the first inductive element E1.

Preferably, while the recharging base 80 carries out the recharging of the power supply unit 70 through the coupling of the first and second inductive element E1, E2 and the power is transferred from the first to the second element, owing to the current I, the first control unit 85 is configured to:
  determine a parameter representative of a phase shift between voltage and current in the first inductive element E1; and
  regulate the frequency of the current I on the basis of this parameter.

Preferably, the regulation of the frequency of the current I is carried out by regulating the drive frequency of the MOS bridge associated with the first inductive element E1 (FIG. 4).

Preferably, the phase shift between the current and voltage is read by means of a second pair of windings C1, C2; by way of example, the latter may have a transformation ratio of between 40 and 60.

Preferably, the first control unit 85, in light of the detected phase shift between voltage and current, attempts to maintain the system in a condition of electrical resonance, so that the loads virtually prove to be of the resistive type.

For this purpose, the circuits in which the first and second inductive elements E1, E2 are inserted, shall be suitably dimensioned.

Preferably, the recharging base 80 is capable of determining in an independent and automatic manner, the presence of the lawn mower 1. This allows for further improvement of the operation of the system, and particularly for the reduction of energy consumption when the lawn mower 1 is not sufficiently close to the recharging base 80.

For this purpose, the first control unit 85 is preferably configured to operate on the first inductive element E1 so as to emit pulses of power of a predetermined duration and intensity, periodically. By way of example, these pulses may have a duration of about 10 ms, and a comprised power of about 120 W.

Note that in the preferred embodiment, the pulses are generated by bringing the first inductive element E1 to a condition of saturation and then implementing emission at the maximum power available. Under these circumstances, following a predetermined interval of time, which may depend on how the system has been configured, a protection circuit (unillustrated) intervenes, thereby limiting the current flowing into the first inductive element E1 and thus determining the end of each pulse emitted.

If the lawn mower 1 is located in proximity to the recharging base 80 prior to intervention of the protection circuit, the lawn mower 1 begins to absorb power through the second inductive element E2 thereof, and a transfer of power to the lawn mower 1 actually begins.

Following emission of these pulses, the first control unit determines a parameter representative of a phase shift between current and tension.

The phase shift is advantageously detected by means of the second pair of windings B1, B2 cited hereinabove.

The phase shift detected is compared with preset reference parameters and based on this comparison, the presence or absence of the lawn mower 1 is determined.

In fact, the phase shift that is detected in the case in which the lawn mower 1 is not located in the vicinity of the recharging base 80, is significantly different from the phase shift determined when the lawn mower 1 is in proximity to the recharging base and the second inductive element E2 can be coupled electromagnetically with the first inductive element E1.

Therefore, when the first control unit 85 determines the presence of the lawn mower 1, the same first control unit enables reception and processing of the charge signal CS, and regulation of the current I accordingly.

Vice versa, when the first control unit 85 determines the absence of the lawn mower 1, the same first control unit is configured to continue emission of said power pulses periodically, until the presence of the lawn mower 1 is determined.

The Applicant has verified that the phase shift between current and voltage is correlated with the efficiency of the transfer of energy from the recharging base 80 to the lawn mower 1. In other words, by evaluating the phase shift following the emission of the cited pulses, the efficiency of the transfer of the energy brought by such pulses can also be evaluated concomitantly. When the lawn mower 1 is not located in proximity to the recharging base 80, the efficiency of the transfer shall be substantially equal to zero; otherwise, when the second inductive element E2 (mounted on the lawn mower 1) is located at a distance of less than about 3 cm with respect to the first inductive element E1 (which is part of the recharging base), the efficiency of the transfer may be, for example, equal to or greater than 85%. Under these circumstances, the recharging base 80 can begin recharging of the power supply unit 70 of the lawn mower 1 through the generation and control of the current I cited hereinabove.

Advantageously, a monitoring circuit 71 is associated with the power supply unit 70.

The monitoring circuit 71 is configured to monitor the power supply unit 70, and particularly, the charge level thereof. When this level drops below a preset threshold, the monitoring circuit enables the generation of an alert signal AS.

The alert signal AS is sent to the second control unit 75, so that the procedures required for re-entry to the recharging base 80 and for recharging of the power supply unit 70 can be performed.

In light of the above, the operation of the apparatus 100 in accordance with the present invention, can be described as follows.

Under its normal operating conditions, the lawn mower 1 moves within the cutting area S, concomitantly activating the blades 30 thereof so as to cut the grass present in the cutting area S. This movement can take place according to a path dictated by a pre-established motion algorithm (random motion, spiral motion, etc.)

As soon as the alert signal AS is generated, that is, when re-entry to the recharging base is necessary, the CPU/control unit 60 commands the movement means 20 in such a manner that the lawn mower 1 returns to the recharging base 80.

The state of the art has made available several techniques for carrying out this manoeuvre; by way of example, those techniques described in European patent applications nos. 11425071.5 and 12154174.2, filed in the name of the same Applicant, can be utilized.

During the time that the lawn mower 1 is still at a distance from the recharging base 80, it periodically emits the cited power pulses.

As soon as the recharging base 80 detects the presence of the lawn mower 1, the latter automatically receives power sufficient to carry out a reading of the charge level of the power supply unit 70 and to generate the charge signal CS.

The first control unit 85, in cooperation with the first inductive element E1, receives the charge signal CS and generates suitable current I based on this charge signal CS.

As stated, the charge signal CS is sent by the lawn mower 1 to the recharging base 80 even during recharging of the power supply unit 70. In this manner, the first control unit 85 is able to regulate the current I based on the progress of the recharging of the power supply unit 70.

The invention achieves important advantages.

First of all, recharging of the power supply unit mounted on the lawn mower takes place in a reasonably brief time, without running the risk of damaging the power supply unit and the lawn mower.

Furthermore, by virtue of the structure and operation of the apparatus described and claimed, the efficiency of the transfer of power from the recharging base to the lawn mower is maximized.

Another advantage emerges from the consideration that the apparatus according to the invention is capable of operating properly even when the distance between the first inductive element E1 and the second inductive element E2 is within the range of 0 to 3 cm.

A further advantage consists in the fact that the recharging base is capable of determining in a simple and automated manner, the presence of the lawn mower so as to begin the operation of recharging the power supply unit, thereby preventing energy wastage when the lawn mower is not located in proximity to the recharging base.

The invention claimed is:

1. An apparatus for cutting grass comprising:
  a robotic lawn mower equipped with: movement means for movement of said lawn mower at least inside a cutting area (S); one or more blades for cutting grass in said cutting area (S); a power supply unit for supplying electrical power to one or more of said movement means and said one or more blades;

wherein the lawn mower moves under normal operating conditions within the cutting area (S), concomitantly activating the blades so as to cut the grass present in the cutting area (S), the movement of the lawn mower taking place according to a path dictated by a pre-established motion algorithm;

a recharging base for said lawn mower, comprising at least a first inductive element (E1) and a first control unit associated with said first inductive element (E1) and configured for making a certain current (I) to flow in said first inductive element (E1);

wherein said lawn mower comprises a second inductive element (E2) associated with said power supply unit and coupleable to said first inductive element (E1) for a recharging of said power supply unit, and a second control unit;

wherein said second control unit is configured to:
generate a charge signal (CS) representative of a charge level of said power supply unit;
transmit said charge signal (CS) to said first inductive element (E1) through said second inductive element (E2);
said first control unit being configured to:
receive said charge signal (CS) through said first inductive element (E1); and
regulate said current (I) based on said charge signal (CS);
a monitoring circuit associated with the power supply unit, configured to monitor the charge level of the power supply unit, enabling a generation of an alert signal (AS) when the charge level drops below a pre-set threshold, the generation of the alert signal (AS) indicating that a re-entry of the lawn mower to the recharging base is necessary; and
a control unit commanding the movement means so that the lawn mower returns to the recharging base as a function of the generation of the alert signal (AS);
wherein said first control unit is configured to:
operate on said first inductive element (E1) so as to periodically emit pulses of power of a predetermined duration and intensity; wherein the pulses are generated by bringing the first inductive element (E1) to a condition of saturation and then implementing emission at a maximum power available, whereby following a predetermined time interval a protection circuit intervenes to limit the current flowing into the first inductive element (E1) and thus determines an end of each pulse emitted;
determine a parameter representative of a phase shift between current and voltage following the emission of each one of said pulses; wherein the phase shift between current and voltage is correlated with the efficiency of a transfer of energy from the recharging base to the lawnmower;
compare said phase shift with reference parameters; and
determine the presence or absence of said lawn mower based on said comparison wherein, when said first control unit determines the presence of said lawn mower, it is configured to:
receive said charge signal (CS); and
regulate said current (I) on the basis of said charge signal (CS), wherein, when said first control unit determines the absence of said lawn mower, it is configured to:
continue emission of said power pulses periodically, until the presence of said lawn mower is determined.

2. The apparatus according to claim 1, wherein a frequency of said charge signal (CS) is representative of the charge level of said power supply unit.

3. The apparatus according to claim 2, wherein a frequency of said charge signal (CS) is proportional to the charge level of said power supply unit.

4. The apparatus according to claim 1, wherein said first control unit is configured to decrease an intensity of said current (I) when there is an increase in the charge level of said power supply unit.

5. The apparatus according to claim 1, wherein said first control unit is configured to:
compare said charge signal (CS) with pre-stored data;
maintain the intensity of said current (I) constant at a first value, if the charge level of said power supply unit is below a first threshold; and
decrease the intensity of said current (I), if the charge level of said power supply unit is above said first threshold.

6. The apparatus according to claim 5, wherein said first control unit is configured to maintain the intensity of said current (I) constant at a second value, which is lower than said first value, if the charge level of said power supply unit is above a second threshold, the latter being higher than said first threshold.

7. The apparatus according to claim 1, wherein said first control unit is configured to:
determine a parameter representative of a phase shift between voltage and current in said first inductive element (E1); and
regulate said current (I) on the basis of said parameter.

* * * * *